(12) United States Patent
Tracy et al.

(10) Patent No.: US 7,959,449 B2
(45) Date of Patent: Jun. 14, 2011

(54) COMPUTING DEVICES HAVING POP-OUT CONNECTOR PORT ARRAYS

(75) Inventors: Mark S. Tracy, Tomball, TX (US); Dustin L. Hoffman, Cypress, TX (US); Jeffrey A. Lev, Tomball, TX (US); Paul J. Doczy, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 12/866,504

(22) PCT Filed: Feb. 21, 2008

(86) PCT No.: PCT/US2008/054532
§ 371 (c)(1),
(2), (4) Date: Aug. 6, 2010

(87) PCT Pub. No.: WO2009/105101
PCT Pub. Date: Aug. 27, 2009

(65) Prior Publication Data
US 2010/0317203 A1    Dec. 16, 2010

(51) Int. Cl.
*H01R 13/44* (2006.01)
(52) U.S. Cl. ................................... 439/131
(58) Field of Classification Search .............. 439/131
See application file for complete search history.

(56) References Cited

U.S. PATENT DOCUMENTS

| 5,411,405 | A | * | 5/1995 | McDaniels et al. | 439/131 |
|---|---|---|---|---|---|
| 5,775,951 | A | * | 7/1998 | Gargiulo | 439/640 |
| 5,975,927 | A | * | 11/1999 | Giles | 439/131 |
| 6,093,038 | A | * | 7/2000 | Chen et al. | 439/131 |
| 6,567,273 | B1 | * | 5/2003 | Liu et al. | 361/737 |
| 6,832,920 | B2 | * | 12/2004 | Glad et al. | 439/131 |
| 6,979,209 | B2 | * | 12/2005 | Griepentrog | 439/131 |
| 7,244,129 | B2 | * | 7/2007 | Reid et al. | 439/131 |
| 7,374,437 | B2 | * | 5/2008 | Reid et al. | 439/131 |
| 7,483,262 | B2 | * | 1/2009 | Yin et al. | 361/679.01 |
| 2006/0085584 | A1 | | 4/2006 | Chen et al. | |

FOREIGN PATENT DOCUMENTS

| KR | 1020020053707 | 7/2002 |
|---|---|---|
| KR | 1020070065606 | 6/2007 |

OTHER PUBLICATIONS

International Searching Authority, International Search Report and Written Opinion dated Nov. 21, 2008, pp. 10.

* cited by examiner

*Primary Examiner* — Gary F. Paumen

(57) ABSTRACT

A pop-out connector port array for provision in a computing device. The array includes an extensible connector port array member that can be transitioned from an initial retracted position in which the array member is contained within the computing device to an extended position in which the array member extends outward from the computing device, the array member comprising multiple integrated connector ports that are accessible when the array member is in the extended position.

25 Claims, 3 Drawing Sheets

COMPUTING DEVICES HAVING POP-OUT CONNECTOR PORT ARRAYS

BACKGROUND

Connector ports, such as universal serial bus (USB) ports, are of high value to computing device users. Such ports are used to support various peripheral devices that may be used in conjunction with the computing device, such as data drives, keyboards, mice, displays, and the like. Typically, computing devices comprise multiple such ports to enable simultaneous use of multiple peripheral devices.

As computing devices become smaller and smaller, however, the space available for connector ports becomes more limited. In such cases, the computing device manufacturer may not be able to provide the number of connector ports that the user needs or desires.

BRIEF DESCRIPTION OF THE DRAWINGS

The disclosed computing devices can be better understood with reference to the following drawings. The components in the drawings are not necessarily to scale.

DETAILED DESCRIPTION

As described above, although connector ports, such as universal serial bus (USB) ports, are popular with computing device users, space may not be available on a given computing device for the number of connector ports that the user needs or desires. As described in the following, however, a greater number of such ports can be provided when the ports are provided in a pop-out connector port array. In some embodiments, the array is provided on a member that is contained within the computing device when in an retracted position and that extends outward from the computing device when in an extended position. In some embodiments, the connector port array is integrated into a module that can be installed within the computing device in place of a PCMCIA card slot module. In such a situation, the space normally forfeited to the PCMCIA card slot can be utilized to provide additional connector ports.

Figure 1:
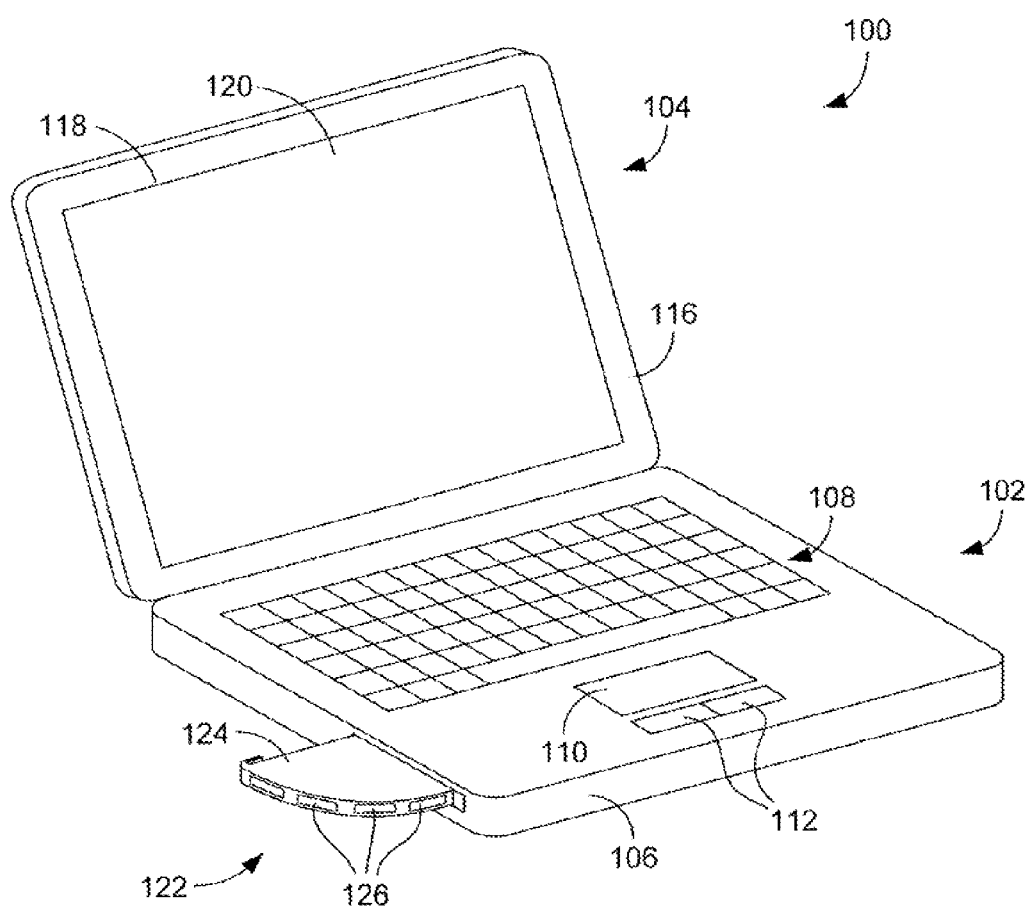
FIG. 1 is a perspective view of an embodiment of a computing device having a pop-out connector port array.

Referring now in more detail to the drawings in which like numerals indicate corresponding parts throughout the views, FIG. 1 illustrates a computing device 100 in the form of a notebook or "laptop" computer. Although a notebook computer is illustrated, it is noted that a notebook computer is cited only as an example. Therefore, the teachings of the present disclosure equally apply to other computing devices that may use connector ports.

As indicated in FIG. 1, the computing device 100 includes a base portion 102 and a display portion 104 that are attached to each other with a hinge mechanism (not shown). The base portion 102 includes an outer housing 106 that surrounds various internal components of the computing device 100, such as a processor, memory, hard drive, and the like. Also included in the base portion 102 are user input devices, including a keyboard 108, a mouse pad 110, and selection buttons 112. The display portion 102 includes its own outer housing 116. Formed within the housing 116 is an opening 118 through which a display device 120 may be viewed. In some embodiments, the display device 120 comprises a liquid crystal display (LCD).

As is further shown in FIG. 1, the computing device 100 comprises a pop-out connector port array, which is generally identified by reference numeral 122. In the illustrated embodiment, the array 122 comprises an extensible connector port array member 124 that includes integrated connector ports 126 that are accessible when the member is in the extended position shown in FIG. 1. An example embodiment for the pop-out connector port array 122 is described in the following in relation to FIGS. 2A and 2B.

Figure 2A:
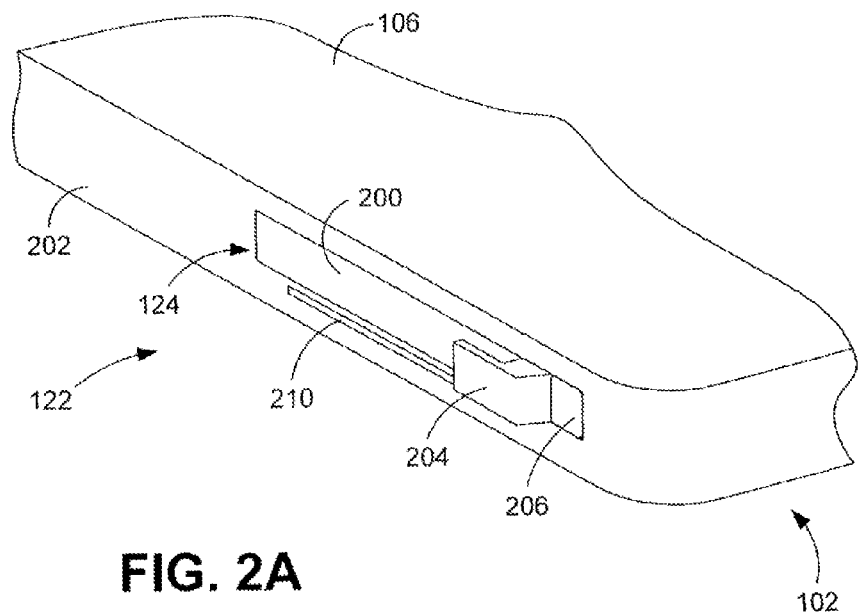
FIGS. 2A and 2B are detail views of the pop-out connector port array shown in FIG. 1 illustrating the array in a retracted position and an extended position, respectively.

With reference to FIG. 2A, the extensible connector port array member 124 of the pop-out connector port array 122 is shown in an initial retracted position. As indicated in FIG. 2A, the array member 124 is integrated into the base portion 102 such that the array member is wholly or substantially contained within the base portion when retracted. The array member 124 is held in that position with a locking mechanism (not shown) that can be selectively released by a user of the computing device 100.

With further reference to FIG. 2A, the extensible connector port array member 124 comprises a planar exterior surface 200 that, when the array member is in the retracted position, is substantially flush with a planar exterior surface 202 of the housing 106 that defines a side of the base portion 102. In the illustrated embodiment, the exterior surface 202 (and the array 122) is provided on a left side of the base portion 102 in a proximal position at which a Personal Computer Memory Card International Association (PCMCIA) card slot typically is provided.

Extending from the extensible connector port array member 124 is an optional finger tab 204 that can be used to extend the array member when the locking mechanism has been released. Such release is achieved using an eject button 206 that, in the illustrated embodiment, is positioned adjacent the finger tab 204. As is further illustrated in FIG. 2A, a smart card slot 210 is accessible beneath the array member 124.

Figure 2B:
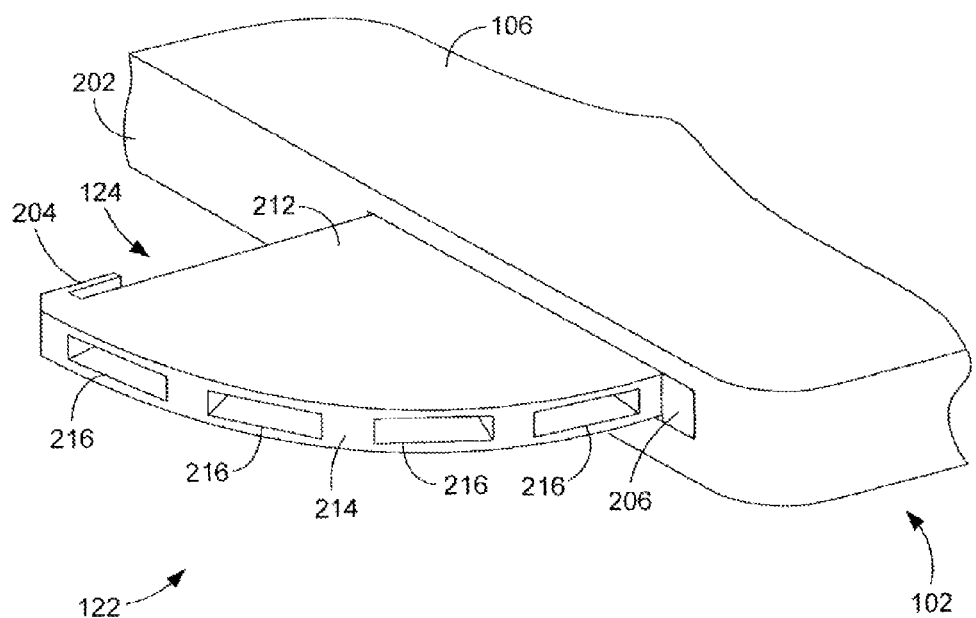

When the eject button 206 is depressed, the locking mechanism that holds the extensible connector port array member 124 in the retracted position is released, and the array member can transition to the extended position illustrated in FIG. 2B. In some embodiments, the array member 124 is manually pulled into the extended position by the user using the finger tab 204. In other embodiments, the array member 124 is automatically extended under a biasing force applied to the array member by a spring (not shown). In either case, the array member 124 can be "popped-out" from the base portion 102. More particularly, the array member 124 pivots or rotates about a pivot point and swings out from the base portion 102 into the extended position. In some embodiments, the array member 124 is held in the extended position with a suitable detent mechanism (not shown). In such a case, the detent mechanism can be overcome by the user when the user wishes to close the array 122 and return it to the initial retracted position.

As indicated in FIG. 2B, the connector port array member 124 comprises planar top and bottom sides (only the top side 212 visible in FIG. 28) and an actuate or rounded lateral side or edge 214 positioned between the top and bottom sides. Provided in the lateral edge 214 is a plurality of openings 216 that lead to integrated connector ports of the array member 124. In the illustrated embodiment, four such openings 216, and therefore integrated connector ports, are provided, although a greater or fewer number can be provided. In some embodiments, the lateral edge 214 forms a semi-circle. Male connectors, such as USB connectors, can be passed through the openings 216 and into contact with the integrated connector ports, which are electrically connected to an internal interface provided within the base portion 102.

As mentioned above, the pop-out connector port array 122 can be provided in a location at which a PCMCIA card slot is normally provided. For a notebook computer that position typically is on the left side of the base portion of the computer adjacent the user (i.e., distal of the display portion). In some embodiments, the pop-out connector port array 122 can replace the PCMCIA card slot. For example, if a given user values additional connector ports over a PCMCIA card slot, the user can specify when ordering his computing device that the pop-out connector port array 122 be installed within his computing device in lieu of the PCMCIA card slot. Given that the need for and/or popularity of PCMCIA slots has waned in recent years, such an option is believed to be one that many customers would appreciate. In other cases, the owner of a computing device may wish to replace an existing PCMCIA card slot with a pop-out connector port array 122.

Irrespective of whether a user wishes to have his computing device initially provided with a pop-out connector port array 122 in lieu of a PCMCIA card slot or wishes to replace an existing PCMCIA card slot with a pop-out connector port array, the provision of the pop-out connector port array can be facilitated with modularity. Specifically, if both the PCMCIA card slot and the pop-out connector port array 122 were formed as modules that can be alternately installed within the computing device, the user's needs or desires could be best served.

Figure 3:
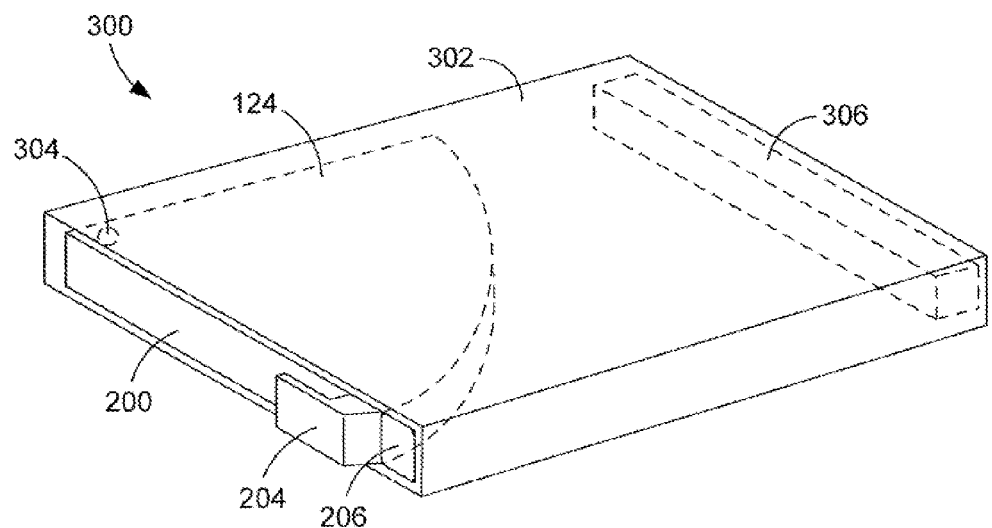
FIG. 3 is a perspective view of an embodiment of pop-out connector port array module that can be used in a computing device.

FIG. 3 illustrates an example of a pop-out connector port array module 300. The module 300 generally includes an outer housing 302 that surrounds the connector port array member 124 when it is within the retracted position. Although shown as comprising multiple walls, the housing alternatively can comprise an open frame. As shown in FIG. 3, the array member 124 is mounted on an axle 304 about which the array member can pivot. Also contained within the housing 302 is a connector 306 that is used to electrically connect the module 300, and its intergraded connector ports, to a mating connector interface provided within a computing device. In some embodiments, the module 300 has dimensions that are similar to those of a PCMCIA card slot module to facilitate alternate use of the two modules.

Figure 4:
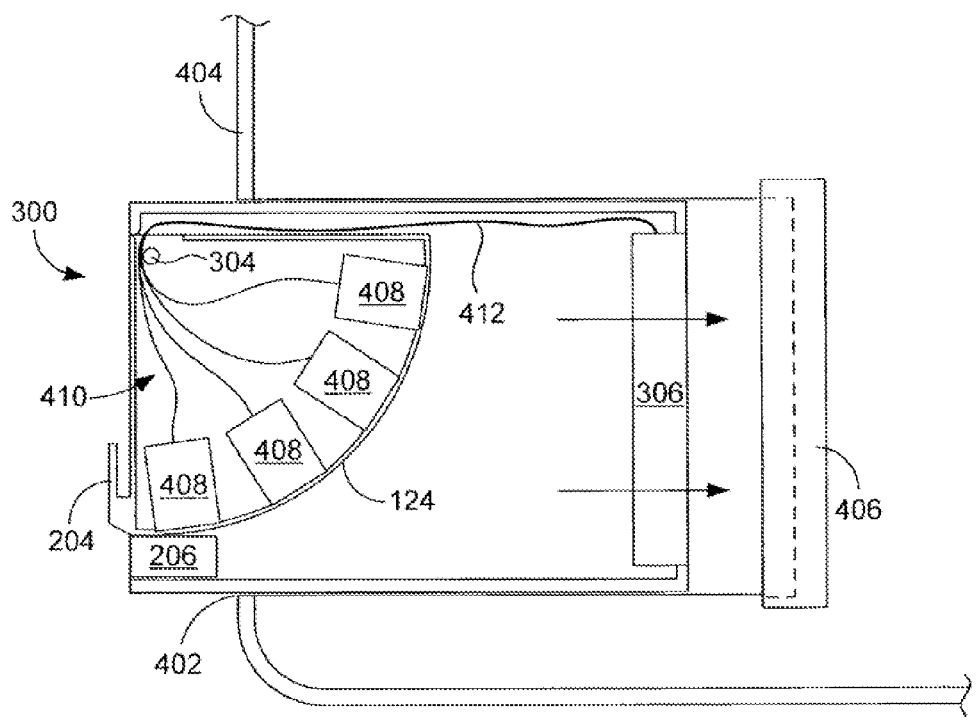
FIG. 4 is a top schematic view of the pop-out connector port array module of FIG. 3 being installed within a computing device.

FIG. 4 illustrates the pop-out connector port array module 300 being inserted into a computing device 400. In the embodiment of FIG. 4, the module 300 is being inserted into the computing device 400 through an opening 402 provided in the housing 404 of the computing device. As depicted in FIG. 4, the module 300 can be slid into the computing device 400 toward a connector interface 406 located within the computing device. By way of example, the connector interface 406 is mounted to a circuit board contained within the computing device 400 that is in electrical communication with one or more internal components of the computing device (e.g., a central processing unit (CPU)). Regardless, once the module 300 is fully inserted into the computing device 400, the connector 306 of the module will be received by the connector interface 406 of the computing device. At that point, the module 300 can be secured to the computing device 400, for example one or more mechanical fasteners such as screws.

With further reference to FIG. 4, the four integrated connector ports 408 of the connector port array member 124 are explicitly identified. Each of those connector ports 408 are electrically coupled to the connector interface 306 via one or more wires or cables 410. By way of example, each of those cables 410 are combined into a further cable 412 that extends to the connector 306. Extension and retraction of the array member 124 is possible at least in part due to the flexibility of the cables 410 and 412.

With the configuration described in relation to FIGS. 3 and 4, the pop-out connector port array module 300 can easily be integrated into a computing device as needed. Such functionality enables computer manufacturers to easily accommodate the desires of their customers. For example, a given computer model that comprises two connector ports by default can be pre-assembled by the manufacturer without provision of either a PCMCIA card slot or a pop-out connector port array. If Customer A wishes to purchase the computer and needs a PCMCIA card slot, the manufacturer can install a PCMCIA card slot module in the computer prior to shipment. If Customer B also wishes to purchase the same computer but needs additional connector ports, the pop-out connector port array module 300 can be installed by the manufacturer. In similar manner, either customer can "swap" one module for another after purchase if his or her needs should change.

The invention claimed is:

1. A pop-out connector port array for provision in a computing device, the array comprising:
an extensible connector port array member that can be transitioned from an initial retracted position in which the array member is contained within the computing device to an extended position in which the array member extends outward from the computing device, the array member comprising:
multiple integrated connector ports that are accessible when the array member is in the extended position;
a rounded lateral edge that comprises a plurality of openings through which the integrated connector ports are accessible; and
an eject button configured to release the array member from the retracted position so that the array member can be transitioned to the extended position.

2. The array of claim 1, wherein the extensible connector port array member comprises a top side, a bottom side, and the rounded lateral edge positioned between the top and bottom sides.

3. The array of claim 2, wherein the lateral edge forms a semi-circle.

4. The array of claim 1, wherein the extensible connector port array member comprises at least three integrated connector ports.

5. The array of claim 1, wherein the extensible connector port array member comprises at least four integrated connector ports.

6. The array of claim 1, wherein the connector ports are universal serial bus (USB) ports.

7. The array of claim 1, wherein the extensible connector port array member further comprises a finger tab that can be used to transition the array member from the initial retracted position to the extended position.

8. The array of claim 1, wherein the extensible connector port array member further comprises an outer surface that is flush with an outer surface of the computing device when the array member is in the retracted position.

9. The array of claim 1, wherein the array forms part of a pop-out connector port array module that can be installed in the computing device in lieu of a PCMCIA card slot.

10. A computing device comprising:
a base portion; and
a pop-out connector port array provided in the base portion, the array including an extensible connector port array member that can be transitioned from an initial retracted position in which the array member is contained within the base portion to an extended position in which the array member extends outward from the base portion, the array member comprising multiple integrated connector ports that are accessible when the array member is in the extended position, wherein the array member comprises a round lateral edge that includes a plurality of openings through which the connector ports are accessible, and wherein the array member comprises an eject button configured to release the array member from the retracted position so that the array member can be transitioned to the extended position.

11. The computing device of claim 10, wherein the connector ports are universal serial bus (USB) ports.

12. The computing device of claim 10, wherein the extensible connector port array member further comprises a finger tab that can be used to transition the array member from the initial retracted position to the extended position.

13. The computing device of claim 10, wherein the base portion comprises an outer surface and wherein the extensible connector port array member further comprises an outer surface that is flush with the outer surface of the base portion when the array member is in the retracted position.

14. The computing device of claim 10, wherein the array forms part of a pop-out connector port array module that has been installed in the computing device in lieu of a PCMCIA card slot.

15. The computing device of claim 10, wherein the computing device is a notebook computer.

16. A pop-out connector port array module for installation in a computing device, the module comprising:
an outer housing;
an extensible connector port array member that can be transitioned from an initial retracted position in which the array member is contained within the outer housing to an extended position in which the array member extends outward from the outer housing, the array member comprising multiple integrated connector ports that are accessible when the array member is in the extended position, wherein the array member comprises a rounded lateral edge that comprises a plurality of openings through which the integrated connector ports are accessible;
an eject button configured to release the array member from the retracted position so that the array member can be transitioned to the extended position; and
a connector configured to electrically connect the module to a connector interface of the computing device.

17. The module of claim 16, wherein the connector ports are universal serial bus (USB) ports.

18. The module of claim 16, wherein the extensible connector port array member further comprises an outer surface that is flush with an outer surface of the computing device when the array member is in the retracted position.

19. The array of claim 1, wherein the array comprises a pop-out connector port array module having a connector to mate with a connector interface of the computing device.

20. The array of claim 19, wherein the connector interface of the computing device is configured to receive a PCMCIA card slot module in lieu of the pop-out connector port array module.

21. The computing device of claim 10, comprising:
a connector interface;
a module comprising the pop-out connector port array, the module having a connector coupled to the connector interface.

22. The computing device of claim 21, wherein the connector interface is configured to receive a PCMCIA card slot module in lieu of the module comprising the pop-out connector port array.

23. The computing device of claim 10, wherein the eject button releases a locking mechanism that holds the array member in the retracted position.

24. The computing device of claim 23, wherein upon release of the locking mechanism, the array member is configured to be manually pulled to the extended position from the retracted position.

25. The computing device of claim 23, wherein upon release of the locking mechanism, the array member is configured to automatically extend to the extended position from the retracted position under a biasing force applied to the array member by a spring.

* * * * *